L. A. MAIDEN.

DISPENSING BOTTLE.

APPLICATION FILED MAR. 15, 1919.

Reissued July 15, 1919. 14,688.

Inventor
L. A. Maiden.
By Lacey & Lacey,
Attorneys

UNITED STATES PATENT OFFICE.

LEAMAN A. MAIDEN, OF DUNNELLON, FLORIDA.

DISPENSING-BOTTLE.

14,688. Specification of Reissued Letters Patent. Reissued July 15, 1919.

Original No. 1,289,218, dated December 31, 1918, Serial No. 123,562, filed October 3, 1916. Renewed May 15, 1918, Serial No. 234,754. Application for reissue filed March 15, 1919. Serial No. 282,995.

*To all whom it may concern:*

Be it known that I, LEAMAN A. MAIDEN, a citizen of the United States, residing at Dunnellon, in the county of Marion and State of Florida, have invented certain new and useful Improvements in Dispensing-Bottles, of which the following is a specification.

This invention relates to improvements in dispensing vessels and has for one of its objects to provide a vessel or container having an outwardly opening receiver adapted to contain a receptacle for the contents of the container, and a closure for the receiver which is connected to the receptacle so that the receptacle may be removed with the closure.

With these and other objects in view, the invention consists in certain novel features of construction as hereinafter shown and described, and then particularly pointed out in the claims; and in the drawings illustrative of the preferred embodiment of the invention:

Figure 1:
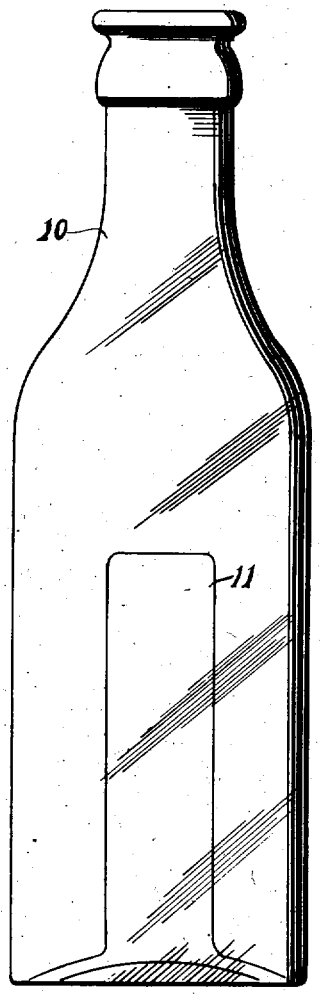
Figure 1 is a side elevation of the improved device.
Figure 4:
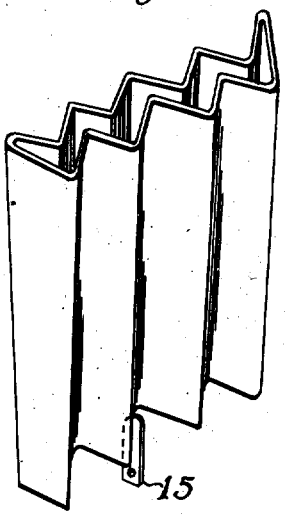
Fig. 4 is a detached perspective view of the receptacle partly open.
Figure 2:
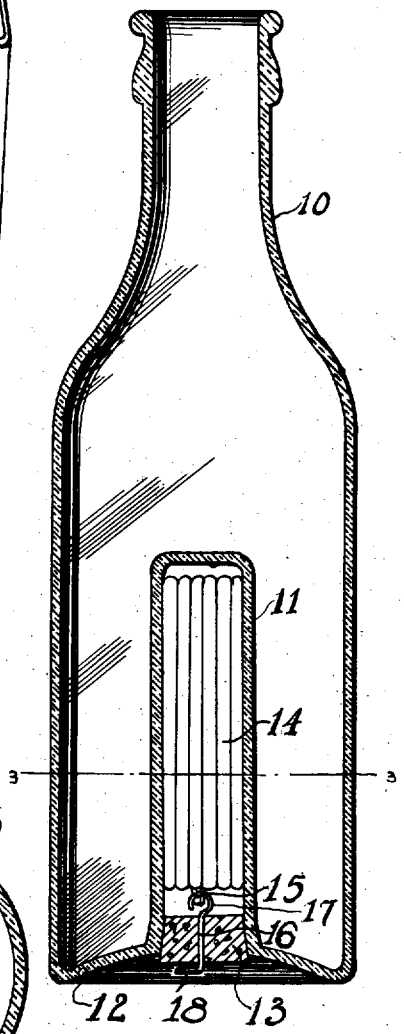
Fig. 2 is a vertical sectional elevation.
Figure 3:
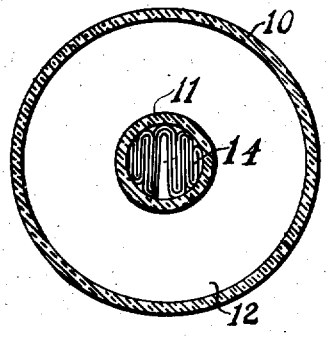
Fig. 3 is a transverse section on the line 3—3 of Fig. 2.

The improved device comprises a container, represented conventionally at 10 and which may be of any suitable form but is preferably in the form of a bottle, as shown, and is formed with an outwardly opening receiver, represented at 11, extending within the container, preferably through its bottom 12. The bottom is preferably curved inwardly so that the container bears by its lower edge only on the table or other support, leaving a considerable space between the lower line of the container and the entrance to the receiver. A suitable closure, represented at 13, is inserted into the open end of the receiver, as shown in Fig. 2. The receiver is designed to contain a receptacle for a portion of the contents of the container, usually liquid. The receptacle may be of any suitable material but will preferably be flexible or collapsible, as represented conventionally at 14 in Fig. 4, partly open, and fully collapsed or closed in Figs. 2 and 3.

For the purpose of illustration, the receptacle is shown formed similar to a collapsible paper drinking cup in common use, but it will be understood that the invention is not necessarily limited to any specific form of the receptacle. The receptacle is provided with a perforated clip 15 of suitable construction, and extending through the closure 13 is a pull wire or like device 16 terminating in a hook 17 which engages the clip 15. At its outer end the wire 16 is formed with a pull eye 18 to enable the closure, together with the receptacle 14, to be withdrawn when required.

By this simple means, a container is produced having a receptacle in which a portion of the contents of the container may be poured when required. The receptacle is thus kept intact and protected from infection or injury when not in use.

The improved device will be found very convenient by travelers and others and may also be employed for dispensing liquids in hospitals, infirmaries, and the like.

Having thus described the invention, what is claimed as new is:

1. A container having an outwardly opening receiver extending therein, a detachable closure for said receiver, a receptacle adapted to be disposed within said receiver and having a perforated ear extending therefrom, and a pull member extending through said closure with an eye at the inner end engaging the perforated ear of the receptacle and a pull loop at the other end externally of the closure, whereby the receptacle may be repeatedly used.

2. A container having an inwardly extending bottom, a receiver within the container and communicating through said bottom with its open end spaced from the lower line of the container, a receptacle adapted to be disposed within said receiver, a pull member extending through said closure and communicating at its inner end with the receptacle and with a pull loop at the outer end, the pull loop adapted to be bent laterally to dispose the same within the line of the lower end of the container when not in use and bendable into open position when used, whereby the receptacle may be repeatedly used.

3. A container having an outwardly opening receiver extending therein, a closure for said receiver and frictionally held therein, a receptacle adapted to be disposed within said receiver, and means for flexibly coupling the closure to the receptacle, whereby the receptacle is constantly coupled to the closure and may be repeatedly used.

4. A container having an outwardly opening receiver extending therein, a closure frictionally engaged in the open end of said receiver, a receptacle adapted to be disposed within said receiver, means for flexibly coupling the closure to the receptacle, and a pull member attached to the closure whereby the receptacle is constantly coupled to the closure and may be repeatedly used.

5. A container having one portion extending inwardly of the adjacent wall thereof, a receiver within the container and communicating through the inwardly extending portion, a receptacle adapted to be disposed within the receiver, a closure for the open end of the receiver with its outer end within the line of the body of the container, and a flexible device connected to the receptacle and to the closure, whereby the receptacle is removable with the closure and remains attached thereto and will be restored to the receiver when the closure is replaced.

6. A container having one portion extending inwardly of the adjacent wall thereof, a receiver within the container and communicating through the inwardly extending portion, a receptacle adapted to be disposed within the receiver, a closure for the open end of the receiver with its outer end within the line of the body of the container, and a pull member extending through the closure and connected at the inner end to the receptacle, whereby the receptacle is removable with the closure and remains attached thereto and will be restored to the receiver when the closure is replaced.

In testimony whereof, I hereto set my hand.

LEAMAN A. MAIDEN. [L. S.]